United States Patent [19]
Arnold

[11] Patent Number: 4,814,629
[45] Date of Patent: Mar. 21, 1989

[54] PIXEL DISPLACEMENT BY SERIES-PARALLEL ANALOG SWITCHING

[75] Inventor: Jack L. Arnold, Pasadena, Calif.

[73] Assignee: Irvine Sensors Corporation, Costa Mesa, Calif.

[21] Appl. No.: 107,352

[22] Filed: Oct. 13, 1987

[51] Int. Cl.$^4$ .............................................. H01J 40/14
[52] U.S. Cl. ................................... 250/578; 250/332; 244/3.16
[58] Field of Search .................... 250/332, 578, 334; 244/3.16, 3.17

[56] References Cited

U.S. PATENT DOCUMENTS 4,675,532 6/1987 Carson ................................. 250/578

Primary Examiner—David C. Nelms
Assistant Examiner—Stephone B. Allen
Attorney, Agent, or Firm—Thomas J. Plante

[57] ABSTRACT

An optical/electronic real time image motion transfer system is disclosed in which voltage output signals from photodetectors in an array are fed through a switching network. This network includes intermediate buses, electronic switching devices between such buses and addresses of the signals from the photodetectors, and electronic switching devices between such buses and addresses of the signals which are fed to the output lines. The output lines preferably receive their multi-plexed signals from filters, or bins, which have stored (and thus integrated) successive voltage signals from individual pixels.

19 Claims, 7 Drawing Sheets

PIXEL DISPLACEMENT BY SERIES- PARALLEL ANALOG SWITCHING

BACKGROUND OF THE INVENTION

This invention relates to a photodetector sensor system which is used to distinguish the motion of specific items relative to a background scene.

For maximum usefulness such a system may need to provide an image of the observed scene in which the background remains stationary, while the motion of an object, or target, is sensed, or to provide an image in which the object, or target, is perceived as stationary with respect to a moving background.

Two lines of prior development pioneered by the assignee of the present application, in the field of photodetector imaging, may usefully be discussed as part of the background information. However, while the usefulness of the present invention will be most fully realized by combining it with those prior developments, such combining is not mandatory. In other words, the present invention has broader potential usefulness.

The first prior line of development by the common assignee is generally called the "Z" technology. This refers to the fact that a focal plane containing a two-dimensional (X and Y) photodetector array is provided on the face of a module, which contains large amounts of electronic processing capacity. The body of the module comprises stacked circuit-carrying layers which lie in planes perpendicular to the focal plane. The dimension of the module perpendicular to the focal plane is its "Z" dimension. Because separate preamplifiers and filters may be included for each detector or picture element, the efficiency of the electronic processing circuitry is dramatically enhanced, and the number of back plane lead-out conductors is drastically reduced.

The second prior art line of development by the common assignee is termed "dynamic stare", because it combines the benefits of staring sensor systems with the benefits of scanning systems. This concept is disclosed and claimed in U.S. Pat. No. 4,675,532, issued June 23, 1987. That patent discusses the usefulness of a combined staring and scanning system in distinguishing a target from its background, both when the target appears to be moving and the background appears to be stationary, and when the background appears to be moving and the target appears to be stationary. In that patent, reference is made to "spatial filters", which respond to the high frequency signals sensed by the scanning motion, and to "temporal filters", which respond to the synchronously demodulated low frequency signals sensed by the same photodetectors. The output signals from the combined system are integrated by storing of repeated pixel signals at a given temporal filter.

SUMMARY OF THE INVENTION

In order to provide motion compensation for target vs. background discrimination, the present invention uses intermediate busing circuitry to provide real time image displacement between the input image plane and the output image plane.

If spatial and temporal filters are used, as in U.S. Pat. No. 4,675,532, the shifting of the signals to displace the image preferably occurs between the spatial filters and the temporal filters. In other words, the input objective image plane is electronically represented at the spatial filters, and the displaced output image plane is electronically represented at the temporal filters. The electrical connections between the two image planes are provided by parallel intermediate buses, whose signals are determined by a switching system under the control of an input representing the image displacement vector, perhaps from an inertial measurement unit.

Broadly, the present invention, on a real time basis, inputs an array of analog voltages, spatially shifts the array, and places the shifted array of analog voltages into an array of holding filters, or bins. Thus a given pixel in the output array may represent the integrated signals of a spatially displaced series of pixels in the objective scene, the result being to render stationary some element, or group of elements, in the objective scene.

DETAILED DISCUSSION OF PREFERRED EMBODIMENT

Figure 1:
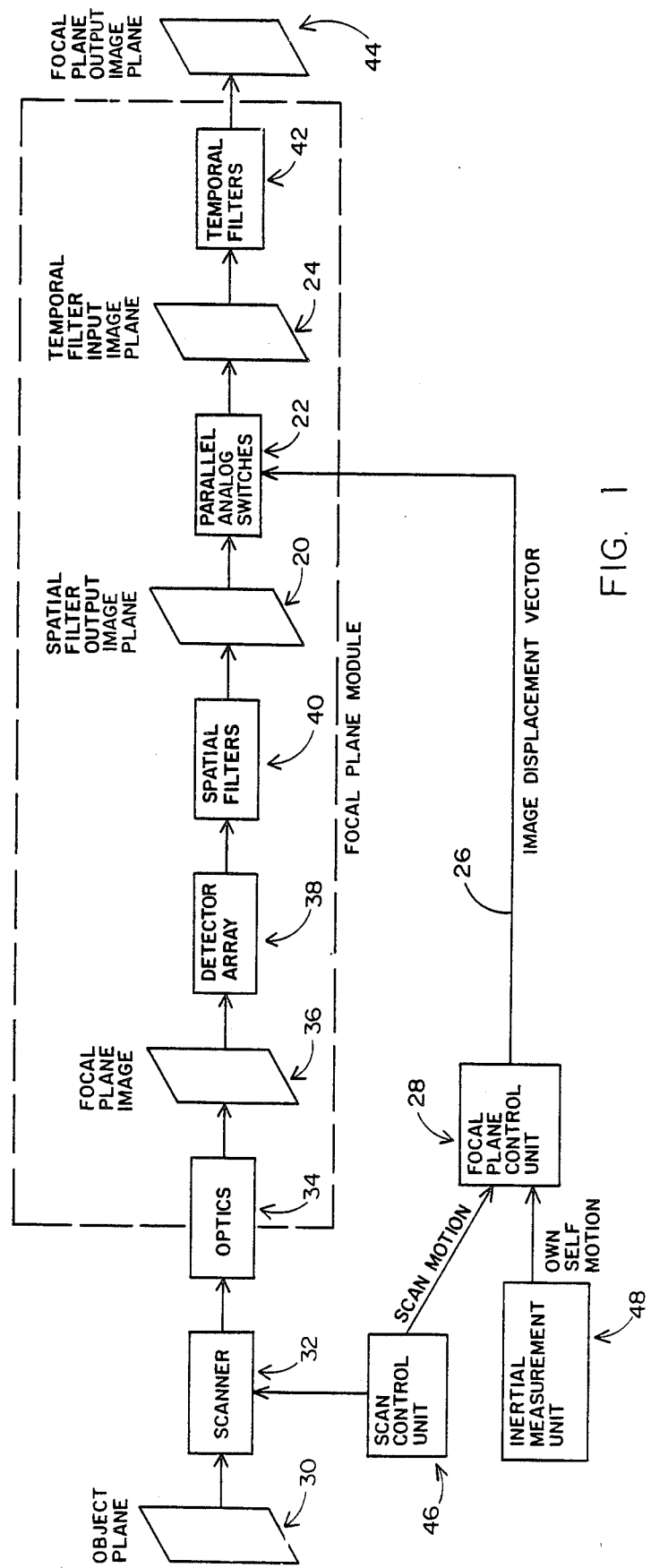
FIG. 1 is a schematic showing a system incorporating the present invention.

FIG. 1 shows in diagrammatic form a plurality of image planes, and the intervening mechanical or electronic components which may be used between those planes, in order to accomplish the purposes of the present invention. The system in FIG. 1 incorporates the "dynamic stare" concepts, which are much preferred, but not mandatory, in conjunction with the present invention.

Image planes, as the term is used here, either exist optically as fields of energy, or exist electronically as arrays of voltages stored in various places. A key relationship shown in FIG. 1 involves (a) an image plane 20, (b) electronic components indicated by box 22 entitled "parallel analog switches", and (c) an image plane 24. As shown by the arrows, the signals move from image plane 20, through electronic switching circuitry 22, to image plane 24. Image plane displacement occurs during this signal transfer, under control of an image displacement vector 26 emanating from a focal plane control unit 28.

The remaining units in the system of FIG. 1 may be described as an object plane 30, which represents the viewed scene, a scanner 32 (optional, but desirable), and optical apparatus 34, which transfer the optical information from object plane 30 to a focal plane image 36 which is received by a photodetector array 38. The photodetector elements in array 38 convert the incoming optical energy into electronic energy for subsequent processing. The detector array 38 is preferably (but not necessarily) a two-dimensional array (along X and Y axes), of the type used in staring detector arrays. Each detector provides a separate channel, which preferably has a focal plane preamplifier into which the detector output is fed.

As previously explained, the present invention serves the purpose of receiving the array of analog voltages from the detectors, and, after shifting the position of that array by switching means, transfering the shifted array to an array of holding bins. Various choices of means are available for inputing, shifting, and then holding, such an array. In FIG. 1, the pre-shift array is shown as an array of spatial filters 40, and the post-shift array is shown as an array of temporal filters 42. The terms "spatial filter" and "temporal filter", which were explained above, have proved to be convenient terminology in describing the operations of the dynamic stare arrangement. As stated above, the detailed description of that arrangement is provided in U.S. Pat. No. 4,675,532.

Because of the usefulness of these terms in discussing a dynamic stare system, the image plane 20 is labeled "spatial filter output image plane", and the image plane 24 is labeled "temporal filter input image plane".

The dashed lines in FIG. 1 indicate the preferred extent of electronics located at the focal plane in a Z-technology module. While the concepts of the present invention are not limited to such focal plane modules, as a practical matter it would be extremely difficult to obtain the real time image plane displacement result of the present invention without the use of Z-technology, which provides extensive electronic processing capabilities to the detector array.

The "off-focal plane" items illustrated in FIG. 1 include, at the output end, a focal plane output image 44, which is transmitted to other electronic processing equipment, and, at the input end, a scan control unit 46, and an inertial measurement unit 48. The scan control unit 46, as the arrows indicate, outputs information to the scanner 32, and to the focal plane control unit 28. The inertial measurement unit outputs motion information to the focal plane unit 28. Various other types of input information to the focal plane control unit may be used, e.g., a priori knowledge of scene motion, mechanical gimbal motion transducers, etc.

Figure 2:
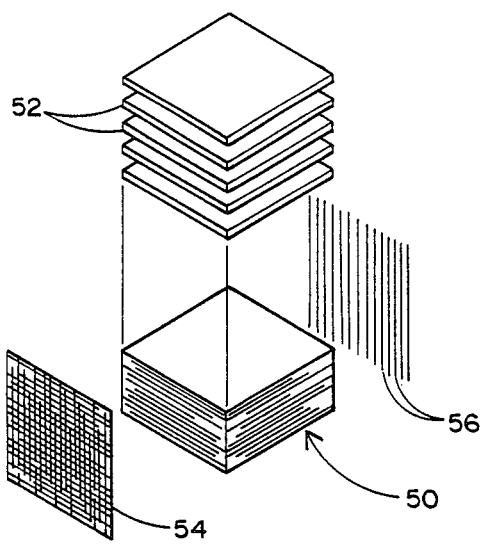
FIG. 2 is an isometric, partially exploded, view of a Z-technology module.

As stated above, the use of Z-technology is recommended in conjunction with the present invention. FIG. 2 provides a very simple illustration of the Z-technology concept. A three-dimensional module 50 includes separately formed circuit-carrying layers 52 which, after being stacked and glued together, are provided on the front, or focal plane, of the module with a two-dimensional array 54 of photodetectors. In one direction (X axis) the closely spaced detectors are located on the surfaces of individual layers, and feed their signals into parallel channels. In the other direction (Y axis) the detectors are spaced by the thickness of the layers. At the back plane, which is spaced from the focal plane by the Z dimension, a plurality of electrical conductors 56 are used to provide busing connections used both for internal and for external signalcarrying purposes.

Figure 3:
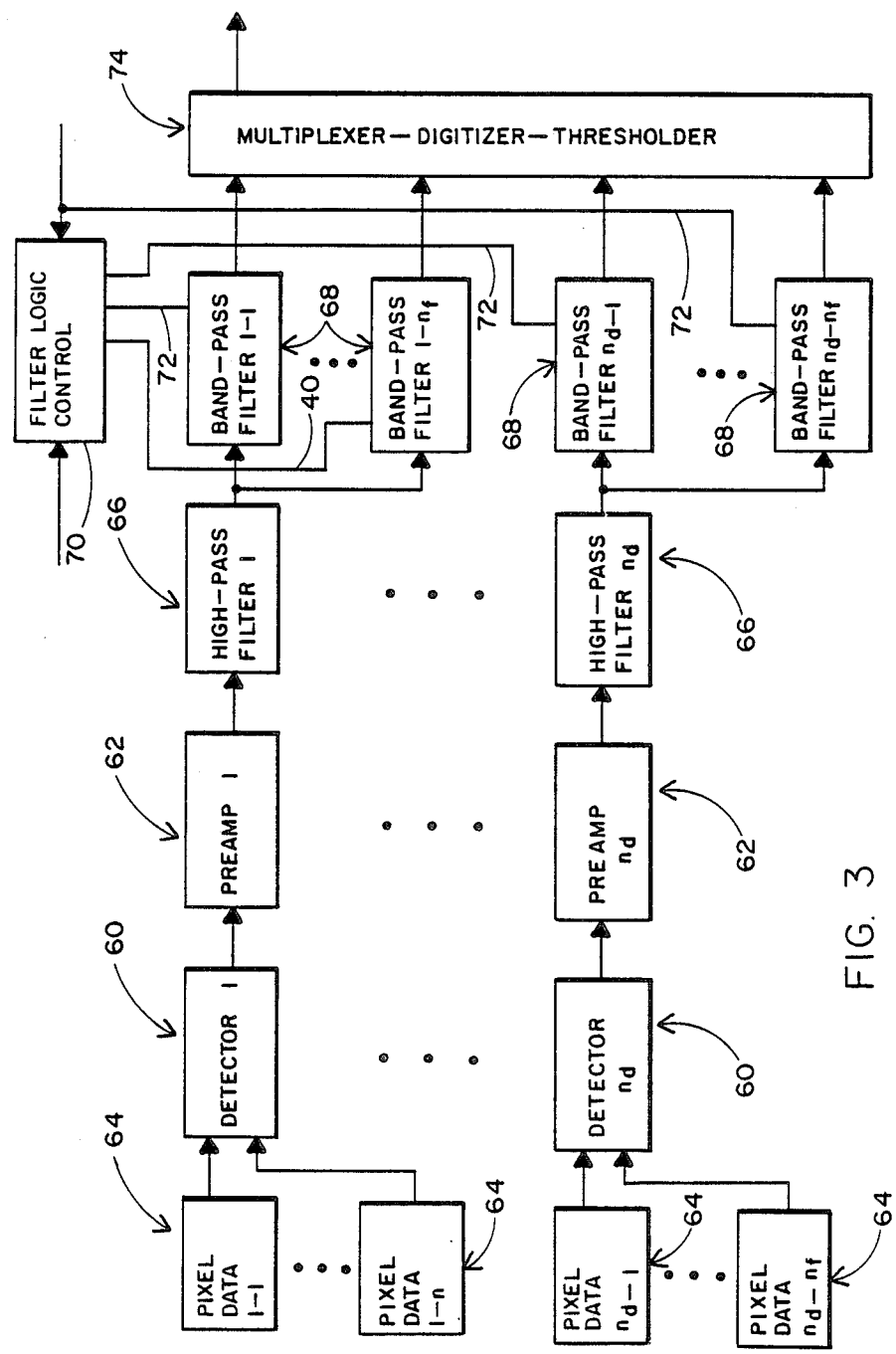
FIG. 3 is substantially identical to FIG. 2 of U.S. Pat. No. 4,675,532, and is included to provide a brief recapitulation of the "dynamic stare" system.

FIG. 3, which is similar to FIG. 2 of U.S. Pat. No. 4,675,532, shows the focal plane (Z-technology) processing of signals in a dynamic stare system, which is desirable, but not mandatory, in conjunction with the present invention. In the figure, two detectors are shown, each indicated by the numeral 60. One is designated "Detector 1", and the other is designated "Detector n(d)", indicating that any desired number (n) of detectors can be connected in parallel in the circuitry. The output of each detector is input to its own preamp 62, often referred to as a transimpedance amplifier (TIA).

Each detector 60 has a plurality of inputs, or sequential signal samples, 64, two of which are shown. One is designated "Pixel data 1-1" and the other is designated "Pixel data 1−n", indicating that a plurality (n) of such signal sources are sequentially providing inputs to a single detector. (The value of "n" for the number of detectors is not related to the value of "n" for the number of separate inputs to each detector).

Each preamp 62 directs its output to a high-pass filter 66, the number of which equals the number of detectors. The filter 66 acts as a "spatial" filter, which passes relatively high frequency signals.

From each spatial filter 66, a plurality of parallel output leads provide inputs to a plurality of parallel bandpass filters 68. Each filter 68 acts as a "temporal" filter, which passes signals having much lower frequencies than those passed by the spatial filter 66. One spatial filter 66 is shown connected to two parallel temporal filters 68 which are designated "Band-pass filter 1-1" and "Band-pass filter 1−n(f)", respectively. Another spatial filter 66 is also shown connected to two parallel temporal filters 68 which are designated "Band-pass filter n(d)−1" and "Band-pass filter n(d)−n(f)", respectively.

The term "spatial filter" is used to signify that the electronic signals which are passed through each filter 66 are caused by different radiation inputs across space, i.e., inputs which provide signal pulses as a result of radiation variations between different locations in the field of view. The scanning process, in effect, converts spatial variations into sequential signals which enter each filter 66.

The term "temporal filter" is used to signify that the electronic signals which are passed through each of the parallel filters 68 are caused by different radiation inputs across time, but from the same point in space, i.e., inputs which provide signal pulses as a result of radiation variations caused by the elapsing of time. This is the normal property of staring sensors, which are represented in the present disclosure by the integrating properties of the individual filters 68, each of which is caused to receive inputs from a selected source in the viewed scene.

The concept that each temporal filter 68 is "dedicated" to a particular pixel 64 is a fundamental aspect of "dynamic staring". Filter logic control circuitry is indicated diagrammatically at 70. It has separate electrical leads 72 to each temporal filter 68. A clocking system is used to cause each temporal filter 68 to receive input signals from its detector 60 only during a fraction $[1/n(f)]$ of the time. In other words, each detector is "time-shared" by a plurality of parallel filters; and each such filter is "on" for a percentage of the total time inversely proportional to the number of such filters connected to a given detector.

The scanning operation will cause a plurality of input signals from separate sources (pixels) to "time-share" a given detector. Synchronization under clock control will cause each parallel filter 68 to "view" the same input signal source at all times, thereby permitting a particular filter to "stare" at a particular source. Each temporal filter 68 outputs to a multiplexer 74, whose output is shown leading out of the Z module.

Figure 4:
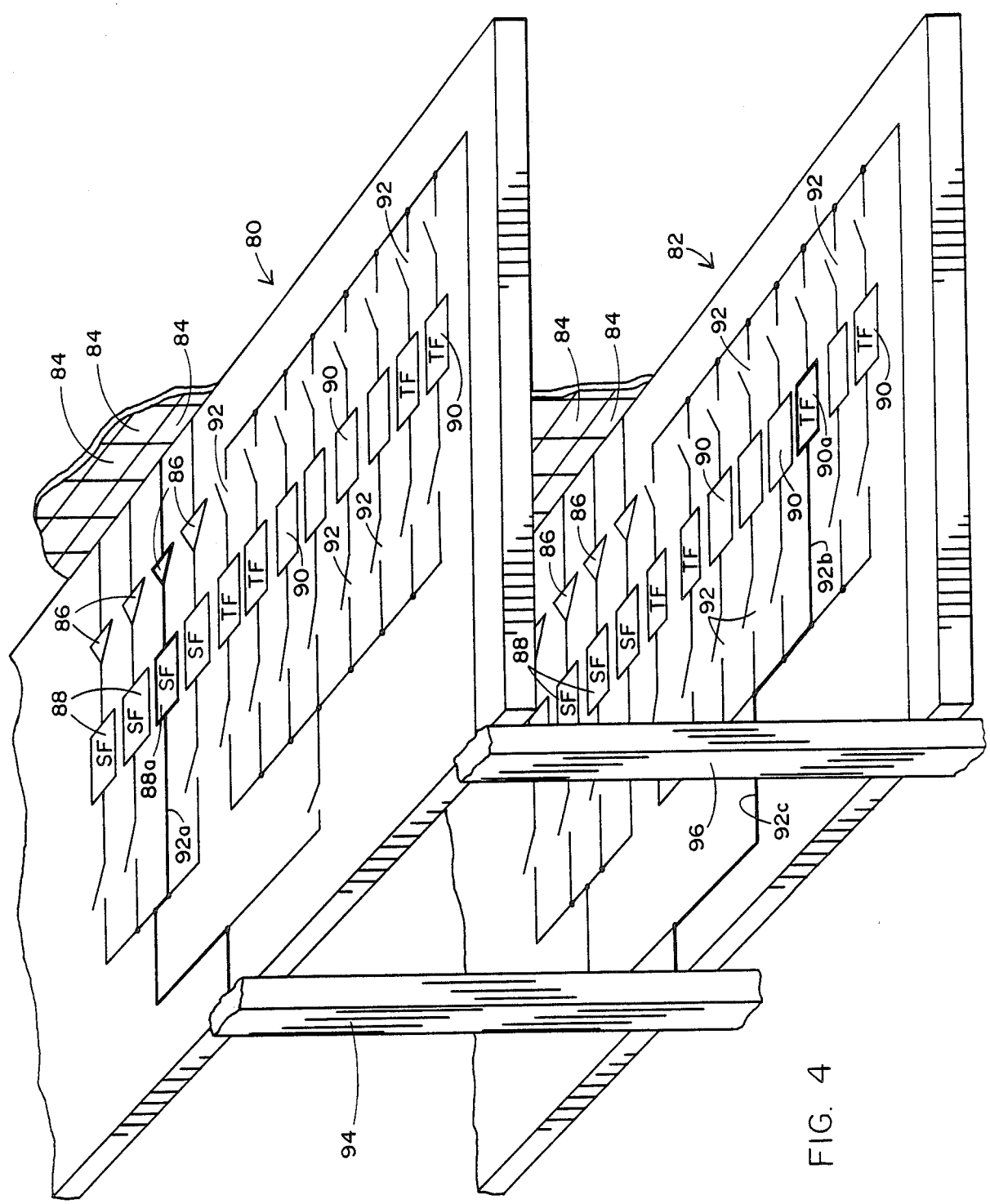
FIG. 4 is a diagrammatic showing of the parallel analog switching circuitry of the present invention.

FIG. 4 shows diagrammatically the parallel analog switching circuitry which, in the present invention, is interposed between the spatial filters 66 and the temporal filters 68 of FIG. 3. In FIG. 4, great liberties are taken with the illustration in order not to clutter it. A higher layer 80 of the module (usually a silicon chip) and a somewhat lower layer 82 are shown. (In an actual module, the intervening space would be filled with layers). A segment of a detector array is shown on the focal plane, comprising a plurality of individual detectors 84. Each detector 84 has its own channel leading to its individual preamplifier 86.

The remaining elements on each of the layers 80 and 82 are spatial filters 88 (also identified by the letters SF), temporal filters 90 (also identified by the letters TF), and many switches 92. The switching network preferably consists of MOSFET transistors which are enabled and disabled in response to logic input signals.

The layout of spatial filters (SF) and temporal filters (TF) in FIG. 4 is not realistic, because each SF will be in a channel containing a detector and preamplifier, whereas the TFs will be located wherever real estate is available, e.g., near the rear of the layers, or interleaved with the SFs. Because it is generally desirable to oversample (by scanning) with each detector, it is assumed that the number of TFs will exceed the number of SFs. For example, the present illustration contemplates a 4-to-1 ratio of TFs to SFs.

A vital element of the present invention is the "intermediate busing" system which cooperates with the switching network to cause the desired image motion compensation. An intermediate bus is identified by the numeral 94. In an actual module, 16 of these vertically extending intermediate buses 94 might be used. Output buses are also required, one of which is shown at 96. In an actual module, 16 of these vertically extending output buses 96 might be used, interspersed with the 16 intermediate buses.

At any given instant, the switching network will cause a single SF to be electrically connected to a single TF. For example, in FIG. 4, the SF 88a is connected via closed switch 92a to the intermediate bus 94; and the TF 90a is connected via closed switches 92b and 92c to the intermediate bus 94. All other switches in the figure are open. Each successive signal transfer from a given SF to a given TF is controlled by the switching network, and is multiplexed by the intermediate bus.

The words "Series-Parallel Analog Switching" in the title of this application refer to the facts that: (a) there are several intermediate buses operating simultaneously (in parallel), and (b) each intermediate bus provides an instantaneous connection between a given SF and a given TF, in a manner much like a "serial data bus" in digital computers. By arranging the timing of switch closures in the SF switches in this figure, and the timing of TF switches, any desired vector displacement can be obtained, i.e., any number of chips down or up, and any number of pixels right or left. The system is run by addressing each SF attached to a bus one after the other, and simultaneously addressing TFs one after the other.

Figure 5:
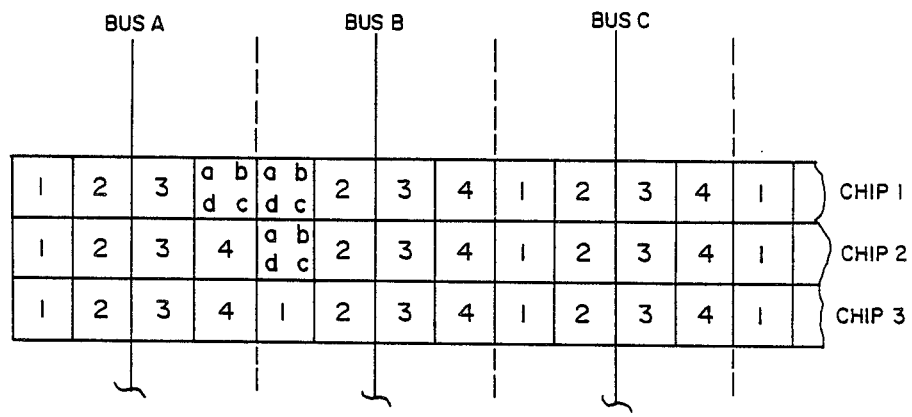
FIG. 5 is a partial focal plane layout, illustrating the relationship between pixels, subpixels, chips, and buses.

FIG. 5 is useful in understanding the arrangements of the detectors, pixels, and buses, as they relate to the detector focal plane and its scan-produced input signals. The stacked layers, or chips, are labeled Chip 1, Chip 2, Chip 3, etc. The vertical buses are identified by uppercase letters A, B, C, etc. Each bus is intended to address four spatial filters (SFs) on any of many chips, each of which SFs is associated with a separate detector. These SF-detector combinations are each labeled 1, 2, 3 and 4, each group of four being separated from the next group of four by a vertical dashed line in the figure. The temporal filters (TFs) are labeled with the lowercase letters a, b, c and d. This is based on the assumption of a 2 to 1 oversampling in each axis (X and Y) by means of a scanner. The numbers 1, 2, 3 and 4 are repeated at each region served by a separate bus. The letters a, b, c and d are repeated at every detector location.

The term "pixel" may signify different elements of the scene in different image planes. It essentially refers to each small unit of the many units which, in the aggregate, constitute an image plane. Because of the transfer of data between the SFs and TFs due to the switching network and intermediate buses, a given pixel on the TF image plane 24 (FIG. 1) can receive, and integrate, signals from a series of different pixels on the focal plane image 36 (FIG. 1). Also, the practice has been adopted of calling the detector units 1, 2, 3 and 4 (FIG. 5) "pixels", and the scanned image plane samples a, b, c and d at each detector (FIG. 5) "sub-pixels". Each subpixel corresponds to a unique temporal filter.

Any detector, or SF, can be addressed by a bus letter (A, B, C, etc.), a chip number (chip 1, chip 2, chip 3, etc.), and a pixel number (1, 2, 3 or 4). Any TF can be addressed by a bus letter, a chip number, a pixel number (1, 2, 3 or 4), and a sub-pixel letter (a, b, c or d).

Figure 6:
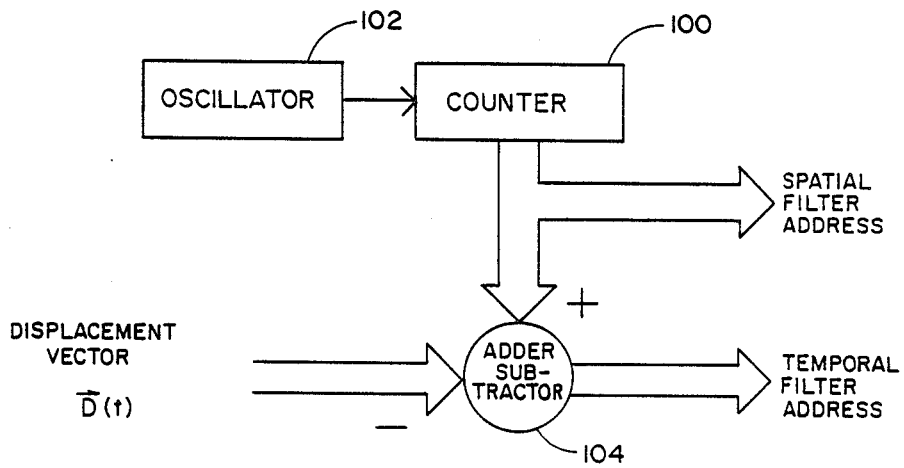
FIG. 6 is a diagram showing the means for generating the spatial filter and temporal filter addresses which are instantaneously connected.

FIG. 6 illustrates the means for generating the TF address, which is accomplished by adding (or subtracting) the displacement factor at any time D(t) from the instantaneous SF address. As the spatial filter address counter counts up, it generates a raster on each intermediate bus, such that the spatial filters are connected to the intermediate bus one after the other in a raster fashion for the region served by that bus. Since there is a region like this for each bus, all buses are operating in parallel from the same "relative" spatial filter. In other words, there are, say, 16 spatial filters hooked up to 16 intermediate buses at one time. Each of these spatial filters occupies the same relative position in the region served by its intermediate bus. At the same time, the temporal filter address is running along at a set distance of displacement from the spatial filter address. A counter 100, operated by a clock 102, outputs pulses to the SF address circuitry, and also to an adder/subtracter 104. The latter combines the pulses from the counter with the displacement vector signals, in order to control the TF address circuitry.

Figure 7:
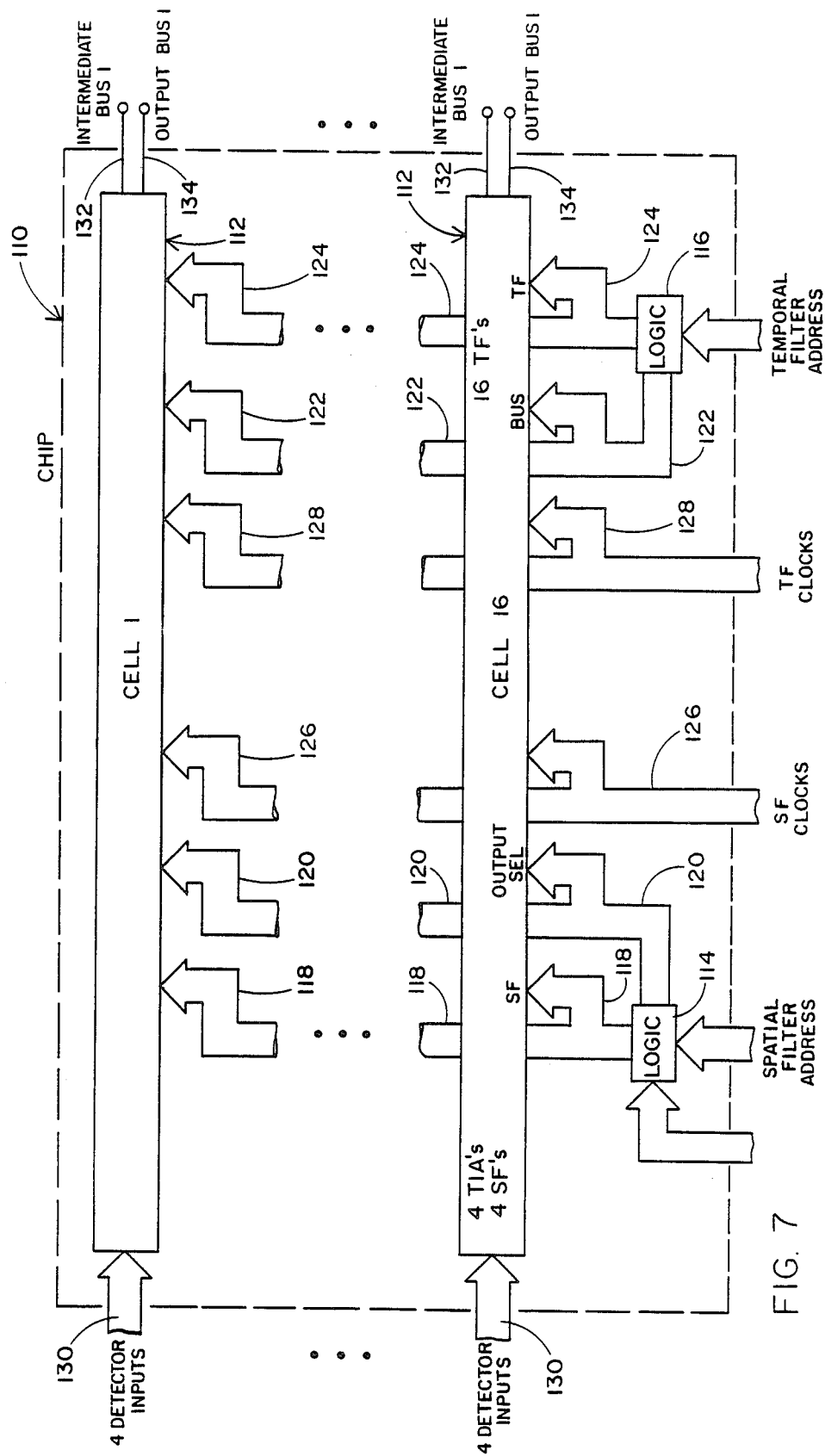
FIG. 7 illustrates a partial circuit layout arrangement for a given layer of a stacked layer module.

FIG. 7 illustrates a circuit layout arrangement of the type which might be used on the layers, or chips, of an electronic module designed for use in the present invention. A chip 110 has a plurality of parallel cells 112 formed on it. If there are 16 intermediate buses, as there are in this typical design, there will be 16 identical circuits (or cells) 112 on the chip. The cells are identified as cell 1 through cell 16 in FIG. 7, which is a simplified chip block diagram. All 16 cells operate identically at the same time from parallel addresses being generated by the logic shown at the lower edge of the chip. Logic block 114 controls the instantaneous SF address, and logic block 116 controls the instantaneous TF address.

The SF logic block 114 has multiple address connections going to each cell via circuitry 118, and multiple address connections going to each cell via circuitry 120. The TF logic block 116 has multiple address connections going to each cell via circuitry 122, and multiple address connections going to each cell via circuitry 124. SF clocks are connected to each cell via circuitry 126; and TF clocks are connected to each cell via circuitry 128. Each cell 112 is shown receiving four parallel (separate) detector inputs at 130, each of which is in a channel having its own TIA (amplifier) and its own SF. Each channel 112 has two bus connections: an intermediate bus connection 132 and an output bus connection 134.

Figure 8:
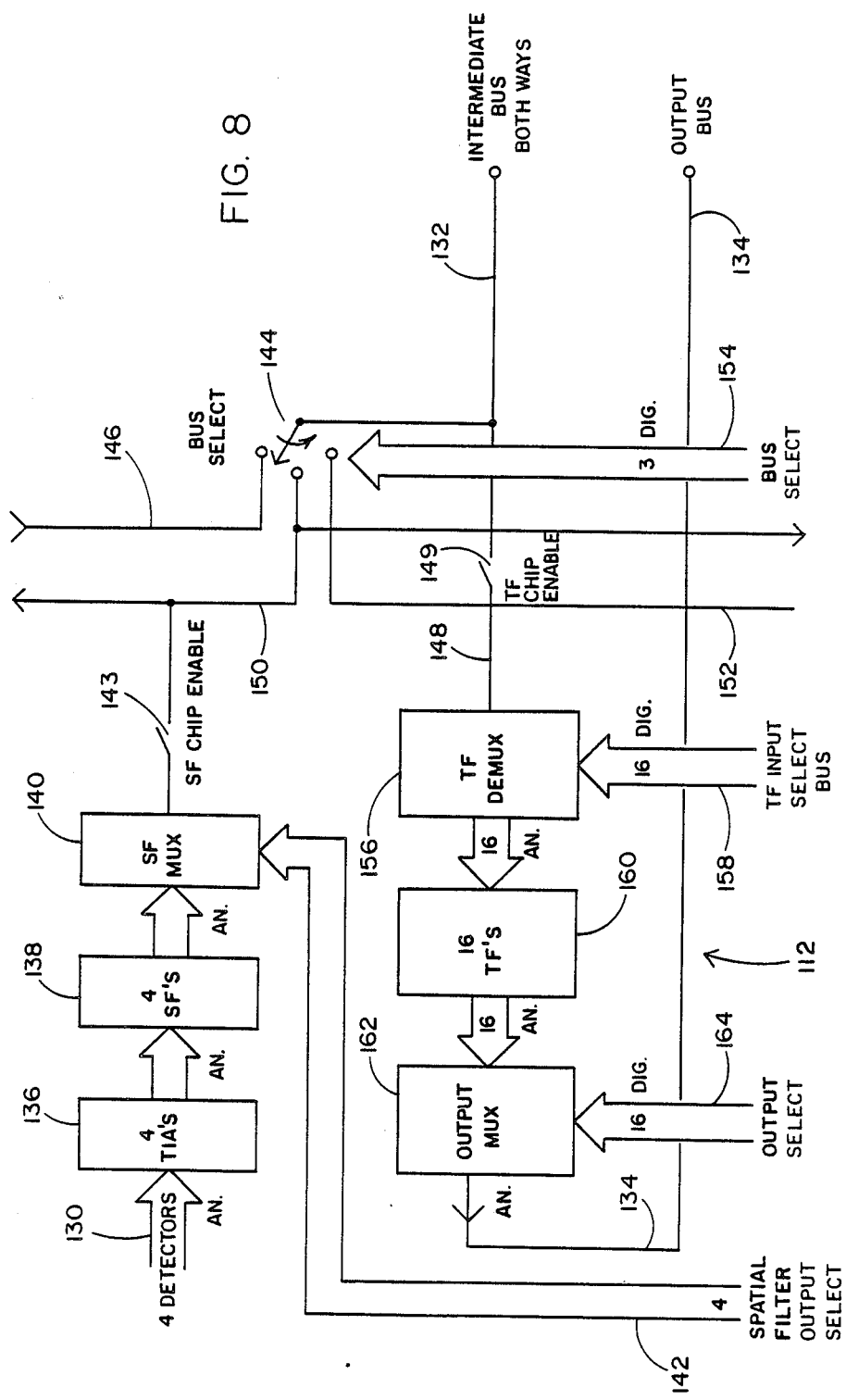
FIG. 8 is a simplified block diagram of a single "cell"

FIG. 8 is a simplified block diagram of a single cell 112. Four parallel detector signals are shown entering at 130. Each detector channel has its own TIA (block 136) and its own SF (block 138). The output signals from the four channels are timed by logic and switching circuitry (SF multiplexer block 140), under the control of an SF output select 142 common to all cells (on all chips in one module). Connection of the SF output signals to the intermediate bus 132 passes through two switches: an SF chip enable switch 143, and a 3-way bus select switch 144. As its name indicates, switch 143 determines which of the chips has an SF circuit closed. The purpose of switch 144 is to permit selection of the bus shown in the figure or either of the adjacent parallel buses (to the right or left of the bus shown). This feature permits continuation of the vector displacement motion from bus to bus. If switch 144 is in its upper closed position it interconnects conductors 146 and 148; if it is in its center closed position it interconnects conductors 150 and 148; and if it is in its lower closed position it interconnects conductors 152 and 148. Switch 144 is controlled by a bus select 154, which is common to all cells (on all chips in one module). Included in the TF conductor is a TF enable switch 149, which determines whether the particular chip has one of its TFs in the instantaneous closed circuit.

Input signals to the TFs in each cell are timed by a TF demultiplexer (block 156), which has 16 channels enabled and disabled under control of a TF input select bus 158, which is common to all cells (on all chips in one module). Each incoming signal is thus selectively transferred to, and stored at, one of the 16 TFs (block 160). The stored TF voltages (charges) are multiplexed onto the output bus line 134, under the control of an output multiplexer (block 162), which is itself controlled by an output select 164 common to all cells (on all chips in one module).

For the arrangement illustrated in these figures, an arbitrary decision has been made to partition the image plane into 16 long, thin subregions. This facilitates image-motion-compensation for certain "push broom" camera applications; while it does not preclude the possibility of using the image-motion-compensation for random linear scanning.

Figure 9:
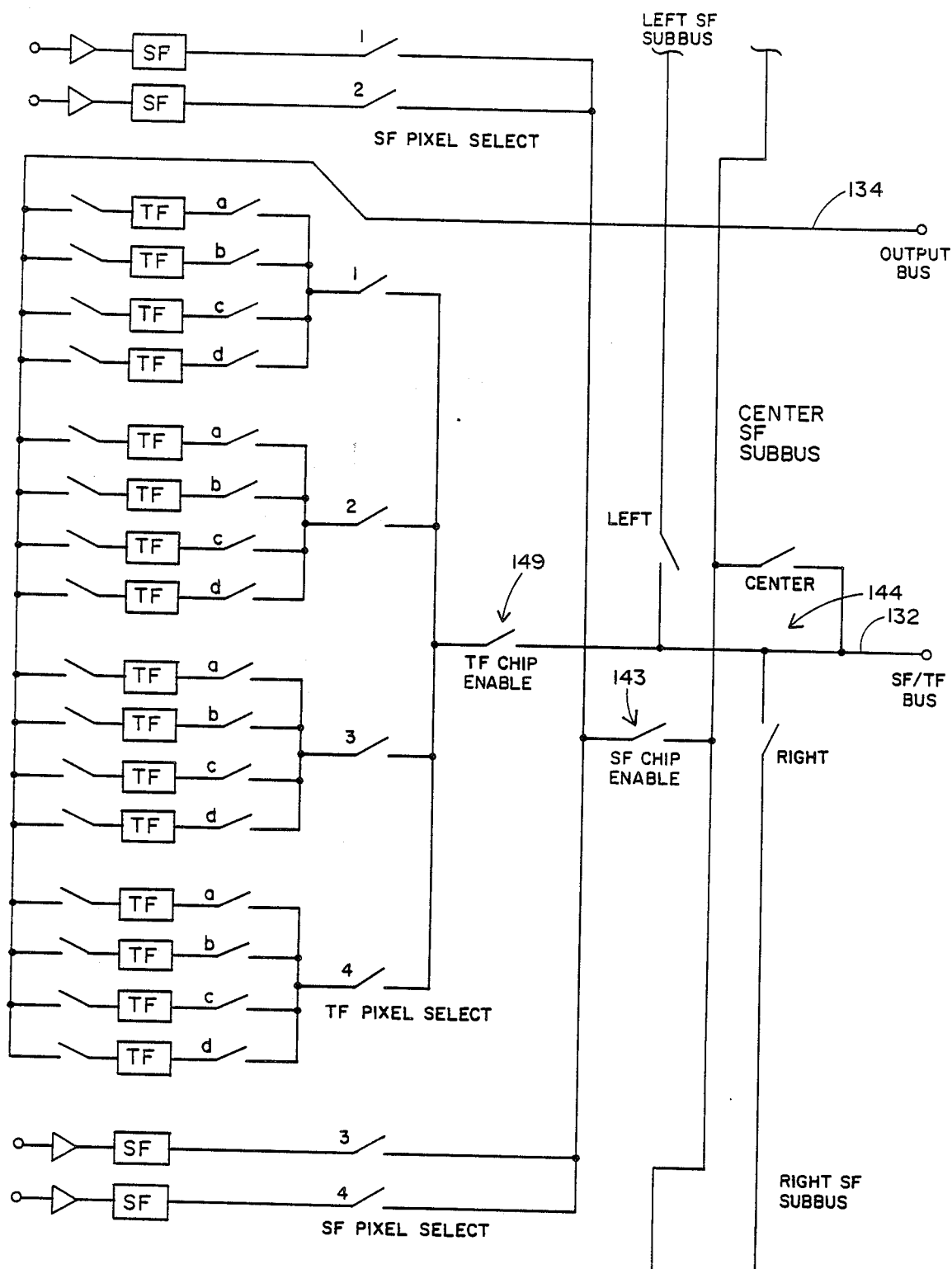
FIG. 9 is a schematic of the switching circuitry in a single "cell".

FIG. 9 goes a step further in providing detailed information, by illustrating schematically a possible switching network in each cell. As stated above, MOSFET transistors are the preferred switching devices. SF switches 1 and 2 are shown at the top of the figure; and SF switches 3 and 4 are shown at the bottom of the figure. The detector signals are shown as inputs to the SFs. The SF chip enable switch 143 determines whether one of the SFs on the particular chip is enabled. The bus select switch 144 is shown as having left, right, and center switches.

There are 16 TFs shown in FIG. 9. Three switches in series must be enabled to transfer the instantaneous signal to one of the 16 TFs: (a) the TF enable switch 149; (b) one of the four TF pixel select switches marked 1, 2, 3 and 4; and (c) one of the four TF subpixel select switches marked a, b, c and d, and included in the same circuit as the enabled TF pixel select switch. If all switches in the circuit which includes one of the TFs are closed, a charge from the incoming SF address will be added to the charges previously stored at the particular TF address. Successive (but time spaced) charges at each TF will integrate to improve the stored signal. At the appropriate time, as determined by the clocked logic system, the charge stored at a given TF will be connected to the output bus line 134 through one of the 16 switches shown at the left of the figure.

From the foregoing description, it is apparent that the TFs, or bins, which provide output signals from the modules, can be changed from looking at one focal plane pixel to looking at another focal plane pixel. And this is a means of adjusting the image to the motion of the target, or of any other feature in the observed scene. For example, it can be used to make the target appear stationary, even though it is actually moving. Or it can be used to keep the background stationary in the output image plane. So, essentially what is being done is switching the temporal filters from pixel to pixel in response to some kind of need, in order to gain maximum understanding of the incoming information. With the present invention, it is feasible to compensate for image motion due to platform movement, image motion due to target motion, image motion due to background motion, etc. Any of those motions can be compensated for electronically, by putting the proper offset command into the parallel analog switches, so that the temporal filters appear to be getting a nearly stationary image.

The integration of the pixel information over a significant period of time is valuable, because the integration causes the signal to rise above the level of noise. The noise is not integrated effectively, because it is random.

As previously stated, the primary reason for motion compensation is to render the effective velocity of some feature, or set of features, in the image, zero, e.g., either the target velocity or the background velocity may be rendered zero. If the target velocity is zero, that means energy is being taken from the target, as it moves across the focal plane, on different detectors at different times. But regardless of which detector that target energy comes into, the signal generated by it will go to the same temporal filter. If that temporal filter is an integrator, or a low pass filter, the signal from the target will build up much faster than any noise, or any background data. If the background velocity is caused to appear zero, by compensating for the background motion, high pass filters are used to detect targets, which appear then to be moving against a stationary background. In other words, after using the switching system to image-motion-compensate the background, an apparently stationary background scene is observed, in which anything moving with respect to it stands out by virtue of the high pass filters on each pixel.

In both cases, target or background motion compensation, a separate source of knowledge of the motion of the target or background must be utilized, in order to accomplish the compensation.

Important benefits of the image plane displacement switching system of the present invention are that it is accomplished (a) in real time, and (b) prior to multiplexing the signals which come off the focal plane circuitry.

From the foregoing description, it will be apparent that the apparatus and method disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. An image displacement signal switching system, for use with a photodetector array, comprising:
    a first image-receiving array of electronic devices which receives output signals from the photodetectors and which has an address for each unit in the array, each photodetector output signal being separated from all other photodetector output signals;
    a second image-receiving array of electronic devices which receives the separate photodetector signals from the first image-receiving array, and which has an address for each unit in the array, each such unit being able to store and thereby integrate a plurality of time-spaced photodetector signals;
    busing/switching circuitry interposed between the first and second image-receiving arrays; and
    control means capable of changing the incoming and outgoing addresses of the busing/switching circuitry, in order to displace the image at the second image-receiving array from the image at the first image-receiving array.

2. The image displacement signal switching system of claim 1 in which the busing/switching circuitry comprises:
    a plurality of parallel buses, each of which carries multiplexed signals which instantaneously transfer a single photodetector signal from a single unit of the first image-receiving array to a single unit of the second image-receiving array.

3. The image displacement signal switching system of claim 1 which also comprises:
    one or more output conductors; and
    multiplexing control means for controlling the timing of transfer to the output conductors of signals stored at the respective units in the second image receiving array.

4. The image displacement signal switching system of claim 1 which also comprises:
    a scanner between the viewed scene and the photodetector array, which produces a series of space-varied signals at each photodetector.

5. The image displacement signal switching system of claim 1 in which:
    the units in the first image-receiving array are high frequency spatial filters; and
    the units in the second image-receiving array are low frequency temporal filters, which integrate a plurality of time-spaced signals from one or more units in the first image-receiving array.

6. An optical image receiving and transmitting system comprising:
    a photodetector array on a focal plane;
    a scanner which provides a series of spatially separated optical signals to each photodetector;
    a first electronic image plane representation which is created by the scanner-photodetector array combination, and which has a multiplicity of signal source addresses;
    a second electronic image plane representation which is created by electrical communication with the first electronic image plane representation, and which has a multiplicity of signal storage addresses;
    a switching network which controls communication between the first and second electronic image plane representations, and which connects a single signal source address to a single signal storage address at a given time;
    address-selecting means for determining and synchronizing the interconnected addresses;
    an output line for carrying multiplexed output signals from the signal storage addresses; and
    timing means for controlling multiplexed connection of each signal storage address to the output line after that storage address has integrated a plurality of separate electronic signals from the signal source addresses.

7. The optical image receiving and transmitting system of claim 6 in which the switching network comprises:
    a plurality of parallel buses, each of which carries multiplexed electronic signals between the first and second image plane representations;
    switches between each bus and the signal source addresses; and
    switches between each bus and the signal storage addresses.

8. The optical image receiving and transmitting system of claim 6 which also comprises:
    a control for the address-selecting means which causes one or more elements in the optical image to appear substantially immobile at the second image plane representation.

9. The optical image receiving and transmitting system of claim 8 in which the control for the address-selecting means causes a target to appear immobile while the background appears mobile.

10. The optical image receiving and transmitting system of claim 8 in which the control for the address-selecting means causes the background to appear immobile while a target appears mobile.

11. The optical image receiving and transmitting system of claim 6 in which the signals at both the signal source addresses and the signal storage addresses are analog voltage signals proportional to, and essentially simultaneous with, the signals received by the photodetectors.

12. The optical image receiving and transmitting system of claim 6 in which the first and second image plane representations and switching network are provided by electronic devices located contiguous to the photodetector array focal plane.

13. An optical/electronic image receiving and transmitting system comprising:
    a photodetector array on a focal plane;
    a scanner which provides a series of spatially separated optical signals to each photodetector;
    a first electronic image plane representation which is created by the scanner-photodetector array combination, and which has a multiplicity of signal addresses;
    a second electronic image plane representation which is created by electrical communication with the first electronic image plane representation, and which has a multiplicity of signal addresses;

a switching network which controls communication between the first and second electronic image plane representations, and which connects a single signal address of the first image plane representation to a single signal address of the second image plane representation at a given time;

address-selecting means for determining and synchronizing the interconnected addresses; and an output line for carrying multiplexed output signals from the signal addresses of the second image plane representation.

14. The optical/electronic image receiving and transmitting system of claim 13 in which the signals at both the signal addresses of the first image plane representation and the signal addresses of the second image plane representation are analog voltage signals proportional to, and essentially simultaneous with, the signals received by the photodetectors.

15. The optical/electronic image receiving and transmitting system of claim 13 in which the first and second image plane representations and switching network are provided by electronic devices located contiguous to the photodetector array focal plane.

16. The optical/electronic image receiving and transmitting system of claim 13 in which the switching network comprises:

a plurality of parallel buses each of which carries multiplexed electronic signals between the first and second image plane representations;

switches between each bus and the signal addresses of the first image plane representation; and switches between each bus and the signal addresses of the second image plane representation.

17. The optical/electronic image receiving and transmitting system of claim 16 which also comprises:

a control for the address-selecting means which causes one or more elements in the optical image to appear substantially immobile at the second image plane representation.

18. The method of providing image motion compensation for information received by a photodetector array, which comprises:

directing successive photodetector electronic output signals to selected addresses in a first electronically-simulated image plane;

transferring the successive photodetector electronic signals from the first electronically-simulated image plane to a second electronically-simulated image plane; and switching such transferred electronic signals during transfer in order to change their relative positions on the first and second electronically-simulated image planes.

19. The method of claim 18 which also comprises:

controlling the switching-effected position changes of the transferred signals by means of an external information input.

* * * * *